US012640628B2

(12) United States Patent
Bickel et al.

(10) Patent No.: US 12,640,628 B2
(45) Date of Patent: May 26, 2026

(54) METHOD FOR PRODUCING A FORMED COIL WINDING, STATOR AND MOLD FOR PRODUCING FORMED COIL WINDINGS

(71) Applicant: Bayerische Motoren Werke Aktiengesellschaft, Munich (DE)

(72) Inventors: Benjamin Bickel, Nuremberg (DE); Noah Streidel, Erlangen (DE); Juntao Zhu, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 164 days.

(21) Appl. No.: 18/681,353

(22) PCT Filed: Sep. 5, 2022

(86) PCT No.: PCT/EP2022/074558
§ 371 (c)(1),
(2) Date: Feb. 5, 2024

(87) PCT Pub. No.: WO2023/052037
PCT Pub. Date: Apr. 6, 2023

(65) Prior Publication Data
US 2025/0007369 A1 Jan. 2, 2025

(30) Foreign Application Priority Data

Oct. 1, 2021 (DE) ...................... 10 2021 125 493.0

(51) Int. Cl.
H02K 15/02 (2025.01)
H02K 1/16 (2006.01)
(Continued)

(52) U.S. Cl.
CPC ............. H02K 15/021 (2025.01); H02K 1/16 (2013.01); H02K 15/062 (2013.01)

(58) Field of Classification Search
CPC .......... H02K 15/045; H02K 3/12; H02K 3/18; H02K 1/16; H02K 15/021; H02K 15/066; H02K 15/13; H02K 15/062
See application file for complete search history.

(56) References Cited

U.S. PATENT DOCUMENTS 8,384,263 B2 2/2013 Hiramatsu et al.
2009/0267441 A1* 10/2009 Hiramatsu ........... H02K 15/066
310/215
(Continued)

FOREIGN PATENT DOCUMENTS

DE 11 2014 002 539 T5 3/2016
DE 10 2016 212 382 A1 1/2018
(Continued)

OTHER PUBLICATIONS

International Search Report (PCT/ISA/210) issued in PCT Application No. PCT/EP2022/074558 dated Dec. 2, 2022 with English translation (4 pages).

(Continued)

*Primary Examiner* — Leda T Pham
(74) *Attorney, Agent, or Firm* — Crowell & Moring LLP

(57) ABSTRACT

A method for producing a formed coil winding includes providing a main body having a plurality of slots distributed across the circumference for arranging layered coils; providing at least one layered coil having a first coil side and a second coil side; arranging the first coil side in a slot in the main body, wherein the layered coil forms a projection at each of the two ends of the main body; form-fittingly and/or frictionally holding the first coil side in an exit region from the slot for holding the first coil side in the slot in a rotationally fixed manner; twisting the coil sides relative to one another in a circumferential direction until the second coil side is aligned with another slot in the main body; and (Continued)

radially shifting the second coil side for arrangement in the other slot.

13 Claims, 3 Drawing Sheets

(51) Int. Cl.
*H02K 15/021*         (2025.01)
*H02K 15/062*         (2025.01)

(56) References Cited

U.S. PATENT DOCUMENTS

| | | | |
|---|---|---|---|
| 2016/0372993 A1 | 12/2016 | Hashimoto et al. | |
| 2018/0166957 A1 | 6/2018 | Kajita et al. | |
| 2018/0198353 A1* | 7/2018 | Kuroyanagi | ........... H02K 1/165 |
| 2021/0351676 A1* | 11/2021 | Feidieker | ................. H02K 3/12 |

FOREIGN PATENT DOCUMENTS

| | | |
|---|---|---|
| DE | 11 2016 002 338 T5 | 2/2018 |
| DE | 10 2017 123 670 A1 | 4/2019 |
| DE | 10 2018 104 838 A1 | 9/2019 |
| DE | 11 2016 000 809 B4 | 12/2020 |
| EP | 0 740 403 A1 | 10/1996 |
| WO | WO 2019/215514 A1 | 11/2019 |

OTHER PUBLICATIONS

German-language Written Opinion (PCT/ISA/237) issued in PCT Application No. PCT/EP2022/074558 dated Dec. 2, 2022 with English translation (9 pages).

German-language Search Report issued in German Application No. 10 2021 125 493.0 dated May 3, 2022 with partial English translation (14 pages).

\* cited by examiner

METHOD FOR PRODUCING A FORMED COIL WINDING, STATOR AND MOLD FOR PRODUCING FORMED COIL WINDINGS

BACKGROUND AND SUMMARY

The present invention relates to a method for producing a formed coil winding, to a stator, and to a tool for producing formed coil windings.

Formed coils are typically formed by one or a plurality of flat wires, often rectangular conductors. As a matter of principle, the production of formed coil windings is more complex than the production of windings from round wire, for example. However, owing to their positive electrical characteristics, formed coil windings are increasingly being used, for example also in stators of electric machines such as are used as traction motors in partially electrically and fully electrically driven motor vehicles. According to one approach taken in the production of formed coil windings, the layered coils are shaped into formed coils and assembled prior to being arranged in a stator, for example. This procedure is relatively complex and is difficult to automate. According to another approach, the flat wire is first wound so as to form a flat layered coil, whereby one coil side of the layered coil is inserted into a slot of the stator, for example. The layered coil is now deformed in such a way that the other coil side can be arranged in another slot of the stator. In the process, intense forces act in particular on the initially arranged coil side. Consequently, the material of the formed coil, and in particular also an insulation of the formed coil that has typically already been applied or attached at this point in time, can be damaged. In U.S. Pat. No. 8,384,263 B2, a tool, which therein is referred to as a "support member", is used to fix the coil sides during forming. However, it has been demonstrated that a production method which is reliable in terms of its process is not possible when using holding devices of this type.

It is, therefore, an object of the present invention to specify a method for producing a formed coil winding, a stator, and a tool for producing formed coil windings, whereby the automated production of formed coil windings in a reliable process is to be enabled in particular.

This object is achieved by a method according to claim 1, by a stator according to claim 8, and by a tool according to claim 10. Further advantages and features are derived from the dependent claims and the description and the appended figures.

According to the invention, a method for producing a formed coil winding comprises the following steps:
- providing a main body which has a multiplicity of slots, arranged so as to be distributed on the circumference, for arranging layered coils, wherein the main body extends along a longitudinal axis;
- providing at least one layered coil, wherein the layered coil has at least one first coil side and at least one second coil side;
- arranging the at least one first coil side in a slot of the main body, wherein the layered coil forms in each case one protrusion on both ends of the main body;
- holding the at least one first coil side in a form-fitting and/or force-fitting manner in the region of the exit from the slot, so as to hold or fix the at least one first coil side in a rotationally fixed manner in the slot;
- twisting the coil sides along a circumferential direction relative to one another until the at least one second coil side is co-aligned with another slot of the main body;

- radially displacing the at least one second coil side for arrangement in the other slot.

According to a preferred embodiment, the main body is a stator body of an electric machine. Alternatively, the main body can also be a rotor body. According to a preferred embodiment, the layered coil is formed from a flat wire or shaped wire, wherein the latter according to a preferred embodiment has an angular, in particular a quadrangular, such as a rectangular, cross section. According to a preferred embodiment, the flat wire, or the layered coil, respectively, is surrounded by an insulation layer. Accordingly, the layered coil preferably has a metallic core which is surrounded by or coated with an insulation. According to one embodiment, the insulation is applied already prior to forming the layered coil (from the flat wire). The main body, such as preferably the stator body, typically has a multiplicity of slots which are arranged so as to be distributed on an inner circumferential face and extend along the longitudinal axis, which may also be referred to as rotation axis. The layered coil, which is partially arranged in the slot, is brought into its final shape by the aforementioned twisting or crossing. It is ensured by way of holding in a form-fitting and/or force-fitting manner the coil side, preferably at both slot exits, that the coil side cannot twist or tilt in the respective slot. In this way, it is ensured in particular that no damage occurs, be it on the layered coil or on the slot. The main body, or else stator body, has two end sides, also referred to as A-side and B-side. The corresponding layered coil is expediently held in each case on both end sides, thus on both slot exits, and in each case in a form-fitting and/or force-fitting manner. The form-fitting and/or force-fitting hold is expediently maintained until the layered coil is completely arranged in the stator. The form-fitting and/or force-fitting hold is in particular also to be understood to mean that the respective coil side is held in its position at the slot exit, the relative position of the coil side in relation to the respective slot exit thus not being changed. The coil side is therefore expediently locationally fixed at the respective slot exit, i.e. it is positionally fixed. It has been demonstrated that this fixation can ensure that the layered coil is not damaged during deformation.

According to one embodiment, the method comprises the following steps:
- providing an auxiliary tool, comprising at least one auxiliary slot;
- arranging the at least one second coil side in the auxiliary slot;
- holding the at least one second coil side in particular in a form-fitting and/or force-fitting manner in the region of the exit from the auxiliary slot, so as to hold the at least one second coil side in a rotationally fixed manner in the auxiliary slot.

As has already been mentioned, the main body expediently has a multiplicity of slots which are arranged so as to be distributed on the inner or outer circumferential face of the main body. Accordingly, the auxiliary tool according to a preferred embodiment has a multiplicity of slots of a congruent design on an inner face or outer face.

According to a preferred embodiment, the main body is a stator body. The auxiliary tool herein is preferably a cylindrical body which on the outer circumferential face thereof has a correspondingly designed number of slots. Alternatively, (should the main body be a rotor body) the auxiliary body can also be designed as a hollow-cylindrical body which has a multiplicity of slots of congruent design on its inner circumferential face.

According to a preferred embodiment, the method comprises the following steps:

providing a multiplicity of layered coils;
  arranging the first coil sides in the slots of the main body;
  arranging the second coil sides in the slots of the auxiliary tool.

The layered coils in terms of their final position can be twisted or crossed, or displaced, respectively, by way of the auxiliary tool, or by twisting the auxiliary tool relative to the main body/stator body. The layered coils are formed into formed coils. The aforementioned auxiliary tool allows the method to be applied very rapidly and in a manner such that it can be readily automated.

The coil sides are expediently held in a likewise form-fitting and/or force-fitting manner at the respective end sides/slot exits of the auxiliary tool. The coil sides of the layered coil, which are arranged in the auxiliary tool, are expediently held in a positionally fixed manner as well as in a form-fitting and/or force-fitting manner during twisting or displacing. It is thereby also ensured here that the layered coil, or the insulation of the latter, is not damaged.

The layered coils during twisting/crossing are advantageously fixed in a rotationally fixed manner within the slots, thus do not move, or move only insignificantly, within the slots. This is also advantageous with a view to automation capability of the method, because the layered coils are always identically or at least similarly deformed.

According to a preferred embodiment, the form-fitting and/or force-fitting hold is effected by way of interlock plates of a tool which are, preferably in each case, arranged or able to be arranged on the slot exit (main body as well as auxiliary tool). The method expediently comprises the following steps:

arranging a first interlock plate and a second interlock plate on the end side on the respective slot exit, wherein the interlock plates have contact faces oriented toward one another, in particular oriented toward one another in the circumferential direction;
  twisting the interlock plates relative to one another in the circumferential direction, as a result of which the coil sides are held in a form-fitting and/or force-fitting manner by way of the contact faces.

The interlock plates preferably comprise in each case one base plate, preferably of metal or a plastics material, a multiplicity of webs expediently extending radially away from the base plate. The interlock plates are expediently arranged one behind the other along the longitudinal axis. One or a plurality of coil sides can be held in a form-fitting and/or force-fitting manner, like in a clamp, by way of the webs and the contact faces formed thereon. The interlock plates can be moved toward and away from one another in the same way as in a clamp. The tool thus advantageously has an open position and a closed position. The adjustment of the interlock plates can be performed hydraulically, pneumatically, electrically and/or purely mechanically.

According to a preferred embodiment, four tools which are, or are to be, in each case arranged on the end side on the main body as well as on the auxiliary tool are typically used in a method for producing a formed coil winding. The tools are positioned or arranged so as to be in each case locationally fixed, or rotationally fixed, in relation to the main body, or the auxiliary tool, respectively. In order for the closed position to be implemented, at least one interlock plate is in each case conceived to be displaceable in the circumferential direction.

According to a preferred embodiment, the method comprises the following step:

bending the coil sides by way of bending portions.

Bending portions by way of which the coil sides can be bent in a controlled manner in the circumferential direction are expediently provided. On the one hand, this is gentle on the material, and the deformation can be controlled in a targeted manner, on the other hand. In particular, undesirable deformations can be avoided to the greatest extent possible by way of the bending portions, or the deformation can be controlled in such a way that the forming of the coil sides, or of the layered coil, takes place as gently as possible and in a directed manner. The directed forming is particularly advantageous with a view to the reliability of the process and the automation capability.

The bending portions are preferably formed on the interlock plates.

The contact faces and/or else the bending portions are preferably surface treated, for example finished, smoothed and/or polished. The surface roughness in Rz is preferably in a range from 6.3 to 2. Edges are preferably radiused, preferably with R0.2 to R0.8, particularly preferably with R0.5. It can be achieved in this way that the insulation of the layered coils does not suffer damage.

The construction of the tool necessitates that one of the interlock plates is arranged closer to the main body, or auxiliary tool, than the other, respectively. The interlock plate arranged closer is the first or inner interlock plate, for example, while the interlock plate arranged farther away is the second or outer interlock plate. The bending portions are expediently arranged on the second interlock plate, or on the second interlock plates, respectively.

According to a preferred embodiment, the method comprises the following step:

arranging the coil ends in a guide element in which the coil ends are entrained during twisting.

As already mentioned, the layered coils are in each case formed from a flat wire. Accordingly, the layered coils have a coil start and a coil end. The coil starts and/or the coil ends are expediently entrained by the guide element during twisting. The guide element expediently has a multiplicity of openings in which the coil starts and/or the coil ends are arranged or routed through, preferably in a form-fitting manner. A guide element of this type can also be referred to as a template. The entrainment has the advantage that the coil starts and/or the coil ends are securely and reliably positioned upon deformation. The reliable positioning of the coil starts or coil ends, respectively, is in turn particularly important with a view to the method being automated, in particular if the coil starts or coil ends have to be gripped by a robot or the like in a subsequent process step, for example.

One guide element is in each case expediently used for the coil ends as well as for the coil starts.

According to one embodiment, the method comprises the following step:

radially supporting the coil sides during twisting by arranging a support element which has a radially outward oriented contact face.

According to a preferred embodiment, the support element is round, in particular circular, in the cross section. The support face herein is radially outward oriented and advantageously prevents that the layered coils, or coil sides, are displaced too far toward the inside, thus toward the longitudinal axis, or rotation axis, respectively, during twisting. In this way, the support element acts in particular as an inward detent during twisting of the layered coils.

According to one embodiment, the method comprises the following step:

simultaneously arranging a slot wedge when radially displacing the at least one second coil side into the slot, wherein the slot wedge is conceived to latch in a form-fitting and/or force-fitting manner into the correspondingly conceived slot.

The arrangement of a slot wedge expediently also takes place simultaneously with the arrangement of the corresponding coil side. The slot wedge is expediently designed in such a manner that it closes off the slot along the entire length of the latter. The slot wedge and/or the slot are/is expediently designed accordingly in such a way that the slot wedge automatically latches into a target or terminal position. The arrangement of the coil side expediently takes place by an expansion tool which is conceived to displace the respective coil side radially outward into the desired slot. This expediently takes place conjointly with the slot wedge, which is arranged between the corresponding coil side and the expansion tool, for example, and is therefore conjointly displaced at the same time.

The invention is also directed toward a stator which is produced by the method according to the invention. The stator is typically a stator of an electric machine such as is used in a fully electrically or partially electrically operated motor vehicle such as a motorcycle, passenger motor vehicle or commercial vehicle.

The stator expediently comprises a multiplicity of slots, wherein the slots have in each case at least one engagement portion which is conceived for the form-fitting and/or force-fitting arrangement of a slot wedge.

It is to be pointed out at this stage that the advantages and features mentioned in the context of the method apply in an analogous manner also to the stator and to the tool mentioned hereunder, and vice versa.

The invention is also directed toward a tool for producing formed coil windings, in particular for application in a method according to the invention, wherein the tool comprises two interlock plates which are arranged along a rotation axis; wherein the interlock plates are conceived to form at least one opening which is conceived for the arrangement of at least one coil side of a layered coil; and wherein the opening has contact faces which are oriented toward one another in the circumferential direction; and wherein the contact faces can be mutually displaced or moved in the circumferential direction in such a manner that the at least one coil side can be held in a form-fitting and/or force-fitting manner.

According to a preferred embodiment, the interlock plates have in each case one base plate and a multiplicity of webs extending radially away from the latter. The aforementioned contact faces are expediently formed on the webs as well as on the base plate. By way of the base plates, or webs, respectively, which are arranged one behind the other, one or a plurality of coil sides can in each case be held in a form-fitting and/or force-fitting manner by two webs, or the contact faces thereof, respectively, as in a manner similar to a clamp. Two webs along the rotation axis of the interlock plates, which also corresponds to the longitudinal axis or the rotation axis of the main body, form in each case one opening through which the coil side or coil sides protrude.

The interlock plates can be moved from an open position to a closed position, whereby the form-fit and/or force-fit is achieved in the closed position.

The webs are expediently designed to be L-shaped. In this way, it is possible that the coil side(s) can to the greatest extent possible be enclosed completely or almost completely, as a result of which a form-fit which is as extensive as possible can be achieved. Thus, a form-fit is expediently achieved as extensively as possible, whereby the aforementioned force-fit is expediently effective in the circumferential direction.

According to a preferred embodiment, at least one web has a bending portion. Bending portions of this type are expediently formed on a multiplicity of webs.

Further advantages and features are derived from the description hereunder of embodiments of the method, of the stator and of the tool, with reference to the appended figures.

DETAILED DESCRIPTION OF THE DRAWINGS

Figure 1:
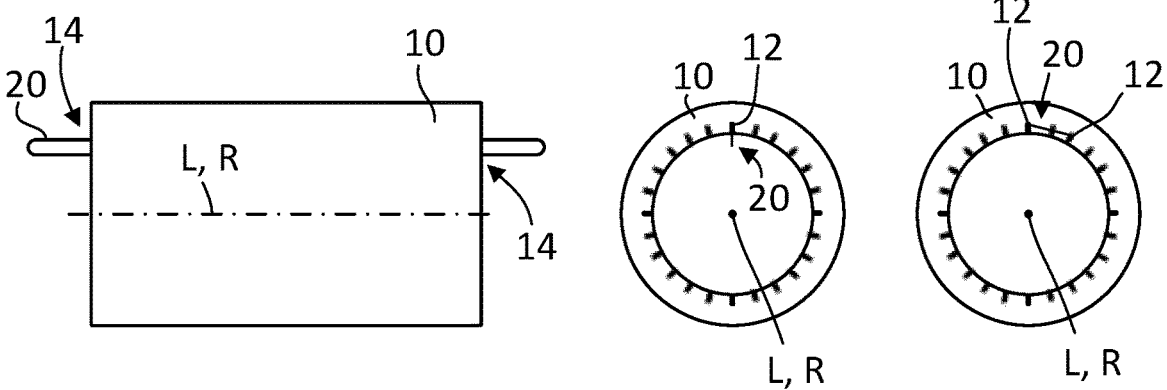
FIG. 1 shows schematic views of a stator body for visualization of the method.

FIG. 1 in a schematic illustration shows on the left a main body 10, wherein this is a stator body, for example. The latter extends along a longitudinal axis L, or a rotation axis R, respectively. By way of example, a layered coil 20 is arranged in a slot of the stator body 10. The layered coil 20 exits the slot in each case at the end side of the stator body 10, cf. reference signs 14, which denote the respective slot exit. The layered coil 20 forms in each case a protrusion on the end side of the stator body 10. The main body is illustrated in the center, when viewed along the longitudinal axis L, or along the rotation axis R, respectively. The slots 12 are schematically illustrated as radially extending lines, cf. reference sign 12 (for reasons of clarity, only one slot is provided with a reference sign). The layered coil 20 is arranged in the upper slot 12, at the 12 o'clock position, but only by way of one coil side. (In order to form a formed coil) the other coil side must be arranged in a slot that is spaced apart therefrom, as is schematically shown on the right. Intense forces act on the layered coil 20 in the process. Layered coils are in each case preferably arranged in all slots, whereby these layered coils are expediently deformed in an automated and simultaneous manner. An auxiliary tool as is schematically shown in FIG. 2 is expediently used herein.

Figure 2:
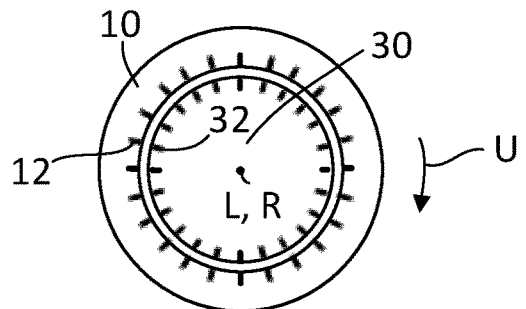
FIG. 2 shows a schematic view of a stator body when viewed along the longitudinal axis thereof, wherein an auxiliary tool is arranged in the stator body.

FIG. 2 shows the stator body 10, substantially known from FIG. 1, when viewed along the longitudinal axis L, wherein an auxiliary tool 30 is formed/arranged in the interior, and in turn has a multiplicity of slots 32 of a congruent design. An auxiliary tool 30 of this type allows a multiplicity of layered coils to be simultaneously deformed.

Figure 3:
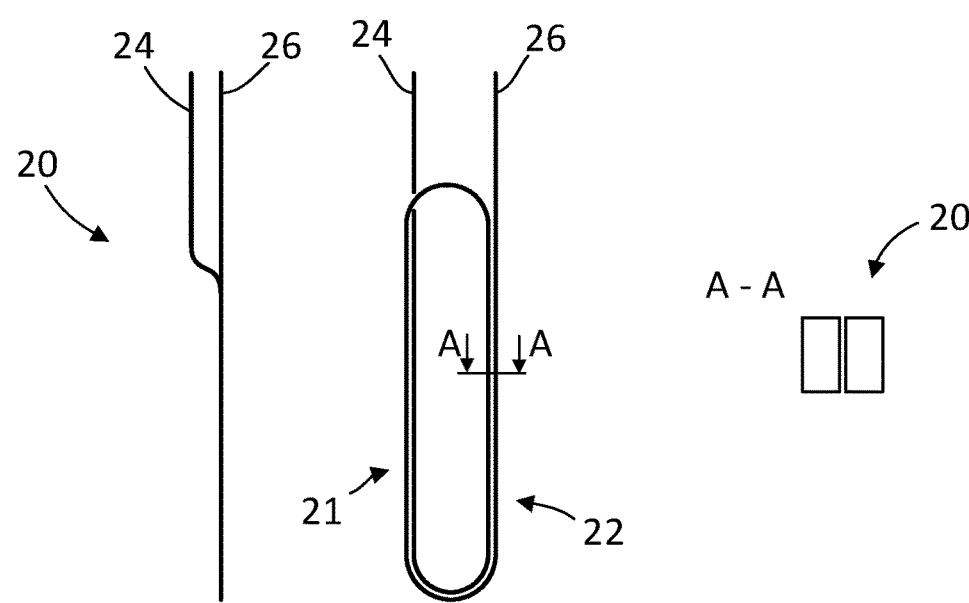
FIG. 3 shows a plurality of schematic views of a layered coil.

FIG. 3 shows in a schematic view an embodiment of a layered coil 20, wherein the layered coil 20 has a coil start 24 and a coil end 26. The layered coil 20 has a first coil side 21 and a second coil side 22. The layered coil 20 schematically illustrated here is a simple layered coil. Additionally, there are also multiple layered coils, for example double, triple, quadruple layered coils, etc. The cross section, schematically illustrated with A-A, is on the extreme right. The layered coil 20 is expediently formed from a flat wire which preferably has an angular, presently in particular a rectangular, cross-sectional shape. The arrangement of the layered coil when producing the formed coil winding expediently takes place in such a manner that, for example, the first coil side 21 is arranged in the stator body, and the second coil side 22 is arranged in an auxiliary tool (cf. reference sign 30 in FIG. 2), or in a correspondingly designed and positioned slot. The coil sides 21 and 22 are mutually twisted by twisting the auxiliary tool relative to the main body or stator body. In particular in the region of its protrusions, the layered coil 20 is shaped into a more or less complicated three-dimensional structure. Once the second coil side(s) has/have been moved to a desired position, it or they is or are displaced or expanded by being displaced radially into the corresponding slot of the stator body. Accordingly, a triple layered coil would have three first coil sides 21 and accordingly three second coil sides 22.

Figure 4:
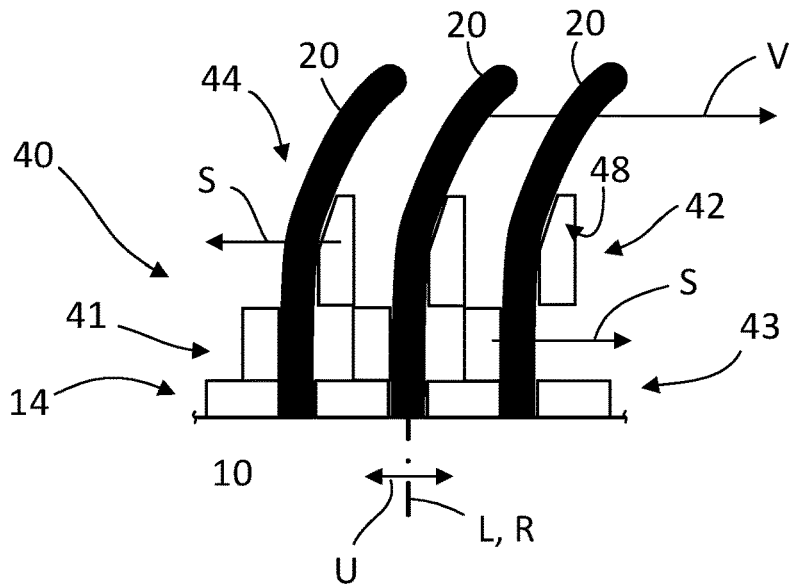
FIG. 4 shows a schematic detailed view in which the twisting of the layered coils is schematically shown in a diagram.

FIG. 4 shows in a schematic view three layered coils 20 during twisting. Illustrated in particular is a slot exit 14 from a main body 10, wherein the latter extends along a longitudinal axis L. Reference sign U schematically indicates a circumferential direction. An intermediate plate 43 is arranged on the end side of the stator body or main body 10. Arranged adjoining thereto is a tool 40 which has a first interlock plate 41 and a second interlock plate 42. The interlock plates 41 and 42 form in each case openings 44 along the longitudinal axis L, through which the layered coils or coil sides protrude; cf. reference sign 20. For reasons of clarity, only one opening is presently provided with a reference sign (cf. reference sign 44). The arrows, which are provided with the reference sign S, identify a potential displacement direction of the respective interlock plates 41, 42. By converging the interlock plates 41, 42, the layered coils 20 arranged therebetween can be held in a form-fitting and/or force-fitting manner. As a result, the layered coils 20, or in particular the coil sides thereof, are securely positionally fixed in relation to the main body 10 and in particular also held in a rotationally fixed manner in the slots of the main body 10. The layered coils 20 are deformed or twisted, respectively, as is schematically indicated by the arrow with the reference sign V. However, the tool 40 holds the layered coils 20 reliably within the respective slot in the region of the slot exit 14, and prevents tilting or twisting of the layered coils 20, or of the corresponding coil sides, in the respective slot.

Figure 5:
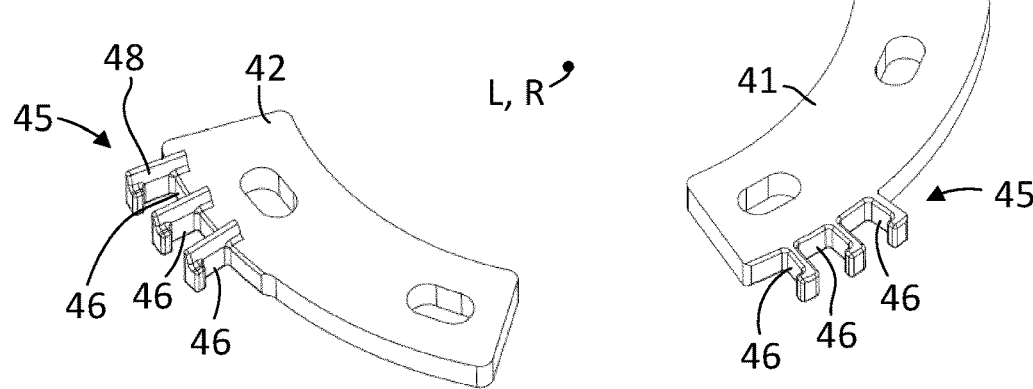
FIG. 5 shows two perspective views of embodiments of interlock plates.

FIG. 5 shows in two perspective views two embodiments of interlock plates 41 and 42, respectively. A base plate from which extend in each case a multiplicity of webs 45 can be seen in each case. Only three webs 45 are in each case schematically illustrated here. Likewise, the base plates are not completely illustrated. In reality, the base plates are preferably segments of a circle which have webs of this type on the entire circumference. It can be seen that contact faces 46 are expediently provided or formed in each case on the webs as well as on the base plate, which contact faces 46 are conceived for bearing on, or contacting, respectively, the layered coils. The webs 45 are presently expediently designed to be L-shaped, as a result of which the layered coils 20 can be held completely or at least almost completely in a form-fitting manner. The webs 45 of the second interlock plate 42 expediently have bending portions 48. The function of the latter will become evident in particular upon viewing FIG. 4. The layered coils can be securely guided by the bending portions 48 during twisting. It can in particular be additionally ensured by way of a corresponding basic design of the radii of the bending portion(s) 48 that the deformation of the layered coils takes place to the greatest extent possible in a gentle manner and by a reliable process.

Figure 6:
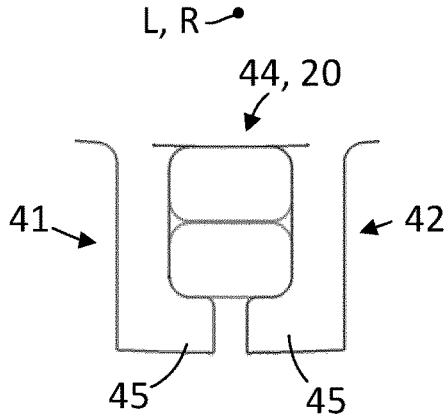
FIG. 6 shows a diagram for visualization of the form-fit and/or force-fit by way of the interlock plates.

FIG. 6 shows the holding of a layered coil 20 in a form-fitting and/or force-fitting manner in an opening 44, which is implemented by the webs 45 of two interlock plates 41 and 42, as viewed along a longitudinal axis L. It can be seen that the layered coil 20 is securely held circumferentially by way of the geometry of the webs 45, which is presently preferably L-shaped, such that twisting of the layered coil 20 within the slot of the auxiliary tool, or else of the stator body, is avoided. An insulation applied to the layered coil, and the material of the layered coil per se, are expediently not damaged.

Figure 7:
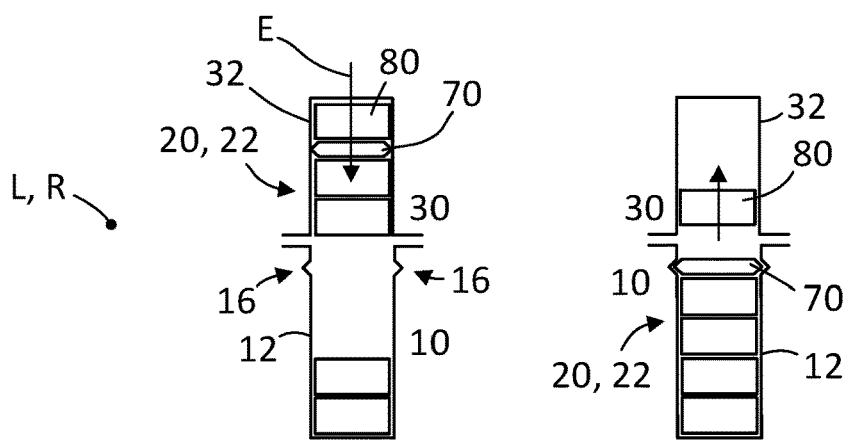
FIG. 7 shows two schematic views for illustration of the method sequence when expanding a coil side of a layered coil into a slot.

FIG. 7 shows in a schematic view a main body 10 in the region of a slot 12, wherein a slot 32 of an auxiliary tool 30 is arranged so as to be co-aligned with the slot 12. Apart from the (dual layer) coil side 22 of a layered coil 20, a slot wedge 70 and an expansion tool 80 are arranged in the slot 32 of the auxiliary tool 30. The second coil side of the layered coil 20 is arranged in the slot 12 of the main body 10 by displacing the second coil side 22 along an expansion direction E by the expansion tool 80, as is schematically illustrated in the right-hand half of the image. The slot wedge 70 is advantageously conjointly displaced at the same time in the process. The slot 12 furthermore advantageously has engagement portions 16 which are conceived to interact in a form-fitting and/or force-fitting manner with the slot wedge 70. The slot wedge 70, once moved to the corresponding position, is thus expediently automatically fixed in the slot 12. As is illustrated by the arrow in the right-hand half of the image, the expansion tool 80 can be returned. The slot wedge 70 is securely latched in the installed position thereof.

Figure 8:
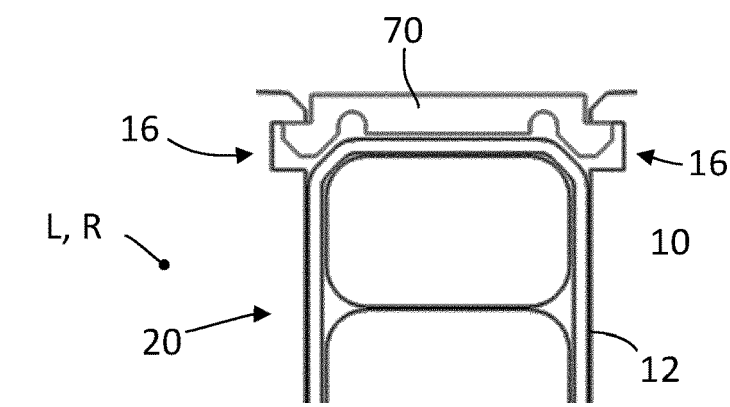
FIG. 8 shows a schematic partial view of a slot of a main body, in which a slot wedge is arranged.

FIG. 8 shows a slot 12 of a main body 10 in an enlarged illustration. The substantial features are already known from FIG. 7. Illustrated in particular is a slot wedge 70 which is conceived to latch, or snap, into correspondingly designed engagement portions 16 of the slot 12. To this end, the slot wedge 70 is expediently designed to be correspondingly resilient or elastic, in particular transversely to the longitudinal axis L schematically illustrated in FIG. 8.

Figure 9:
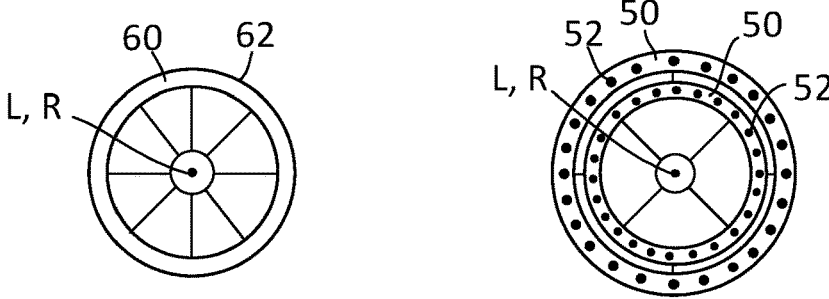
FIG. 9 shows two schematic views which show an embodiment of a support element and of a guide element.

FIG. 9, in the left-hand half of the image thereof, shows a schematic view of a support element 60 which has a support face 62 on the circumference. Two guide elements 50, which have in each case a multiplicity of openings 52 that serve for arranging, or guiding through, the corresponding coil starts or coil ends of the layered coils are illustrated in the right-hand half of the image. It is to be ensured in particular by the guide elements 60 that the coil ends or coil starts of the layered coils are not impermissibly displaced during twisting of the layered coils. In other words, the coil starts or coil ends can be reliably entrained by the guide elements 50 and in this way be positioned, this being decisive for the automation capability of the method. The support element 60 serves in particular as an inner detent during the twisting of the layered coils.

Figure 10:
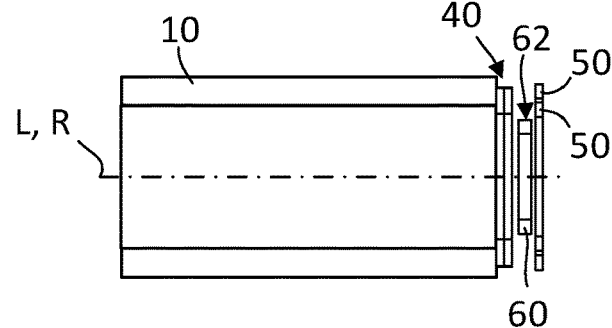
FIG. 10 shows a schematic view of a main body for visualization of the position of a tool, of two guide elements and of a support element.

FIG. 10 shows in a schematic view an embodiment of a main body 10 which extends along a longitudinal axis L. Illustrated in particular is the arrangement of a tool 40, of a support element 60 and of two guide elements 50 for guiding the coil starts and ends, respectively. The diagram is intended to schematically highlight the arrangement of the different elements.

LIST OF REFERENCE SIGNS

10 Main body, stator body
12 Slot
14 Slot exit (main body, stator body)
16 Engagement portion
20 Layered coil
21 First coil side
22 Second coil side
24 End portion
30 Auxiliary tool
32 Auxiliary slot
34 Slot exit (auxiliary tool)
40 Tool
41 First interlock plate
42 Second interlock plate
43 Intermediate plate
44 Opening
45 Web
46 Contact face
48 Bending portion
50 Guide element
52 Opening
60 Support element
62 Radial support face
70 Slot wedge
80 Expansion tool
L Longitudinal axis
R Rotation axis
U Circumferential direction
E Expansion direction
S Displacement direction
V Twisting direction

What is claimed is:

1. A method for producing a formed coil winding, comprising:

providing a main body comprising a plurality of slots arranged so as to be distributed on a circumference for arranging layered coils, wherein the main body extends along a longitudinal axis;

providing at least one layered coil, wherein the at least one layered coil has at least one first coil side and at least one second coil side;

arranging the at least one first coil side in a slot of the plurality of slots of the main body, wherein the at least one layered coil forms in each case one protrusion on both ends of the main body;

holding the at least one first coil side in a form-fitting and/or force-fitting manner in a region of a first exit from the slot on a first end of the main body, so as to hold the at least one first coil side in a rotationally fixed manner in the slot, further comprising:

arranging, at the first exit from the slot on the first end of the main body, a first interlock plate and a second interlock plate having contact faces oriented toward one another in a circumferential direction about the longitudinal axis of the main body;

twisting the first and second interlock plates relative to one another in the circumferential direction such that the contact faces clamp the at least one first coil side to hold it in the slot in the rotationally fixed manner;

twisting the at least one first coil side and the at least one second coil side along the circumferential direction relative to one another until the at least one second coil side is co-aligned with another slot of the plurality of slots of the main body; and radially displacing the at least one second coil side for arrangement in the another slot.

2. The method according to claim 1, comprising:

providing an auxiliary tool comprising at least one auxiliary slot;

arranging the at least one second coil side in the at least one auxiliary slot; and holding the at least one second coil side in a form-fitting and/or force-fitting manner in a region of an exit from the at least one auxiliary slot, so as to hold the at least one second coil side in a rotationally fixed manner in the at least one auxiliary slot.

3. The method according to claim 1, comprising:

bending the at least the one first coil side and the at least one second coil side by bending portions.

4. The method according to claim 1, comprising:

arranging coil starts and/or coil ends in a guide element in which the coil ends are entrained during twisting.

5. The method according to claim 1, comprising:

radially supporting the at least one first coil side and the at least one second coil side during twisting by arranging a support element which has a radially outward oriented support face.

6. The method according to claim 1, comprising:

simultaneously arranging a slot wedge when radially displacing the at least one second coil side into the another slot, wherein the slot wedge is configured to latch in a form-fitting and/or force-fitting manner into the another slot.

7. A stator, produced according to the method according to claim 1.

8. The stator according to claim 7, comprising:

a plurality of slots, wherein the plurality of slots have in each case at least one engagement portion which is configured to provide a form-fitting and/or force-fitting arrangement of a slot wedge.

9. A tool for producing formed coil windings, comprising:

two interlock plates arranged along a rotation axis of a main body of a stator such that the two interlock plates are stacked one on top of the other along the rotation axis, wherein the interlock plates are configured to form at least one opening which at least one opening is configured for arrangement of at least one coil side of a layered coil passing through and exiting out of a slot of the main body at a first exit of the slot, wherein the at least one opening has contact faces which are oriented toward one another in a circumferential direction of the main body about the rotation axis, wherein a first contact face is formed by a surface of one of the two interlock plates, and a second contact face is formed by a surface of another of the two interlock plates; and wherein the two interlock plates are configured to rotate about the rotation axis relative to each other between an open position and a closed position, such that the contact faces are mutually moved in the circumferential direction in such a manner that the at least one coil side is held in a form-fitting and/or force-fitting manner between the contact faces.

10. The tool according to claim 9,
wherein the interlock plates have in each case one base plate and a plurality of webs extending radially away from the base plate, and
wherein the contact faces are formed on the base plate and on the webs.

11. The tool according to claim 10,
wherein the webs are L-shaped.

12. The tool according to claim 10,
wherein the webs, conjointly with the base plate, are configured to completely or almost completely enclose the at least one coil side.

13. The tool according to claim 10,
wherein at least one web has a bending portion.

\* \* \* \* \*